June 19, 1945. F. E. JOHNSON 2,378,638
ADJUSTABLE ROTARY OPERATIVE FASTENER STUD
Filed Aug. 24, 1943
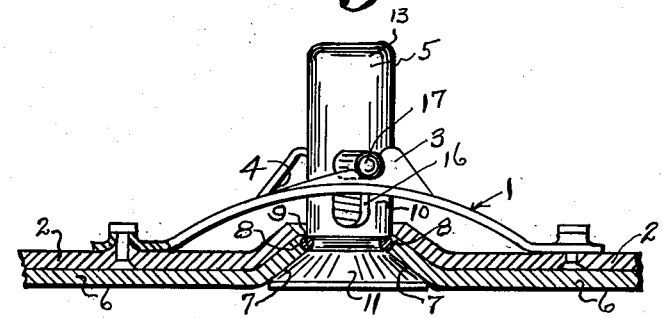
Fig. 1.
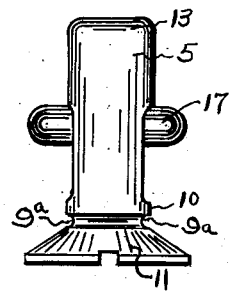 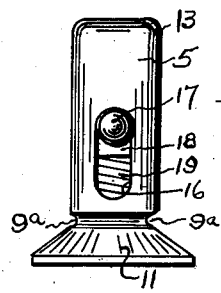 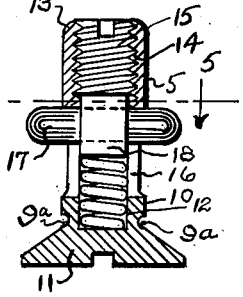
Fig. 2.  Fig. 3.  Fig. 4.
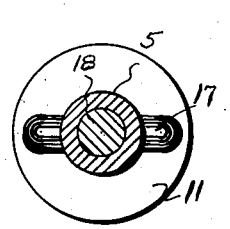 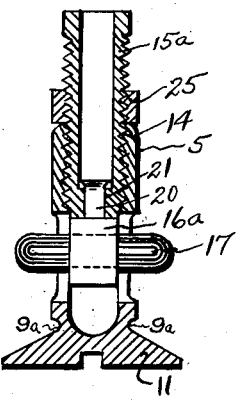 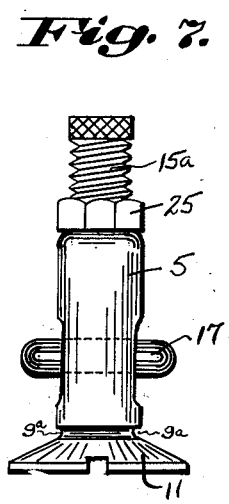
Fig. 5.  Fig. 6.  Fig. 7.
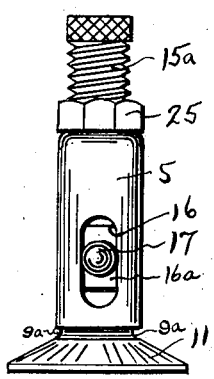
Fig. 8.
Inventor
Frank E. Johnson.
By Walter S. Jones
Attorney Patented June 19, 1945

2,378,638

UNITED STATES PATENT OFFICE 2,378,638

ADJUSTABLE ROTARY OPERATIVE FASTENER STUD

Frank E. Johnson, Malden, Mass., assignor to United-Carr Fastener Corporation, Cambridge, Mass., a corporation of Massachusetts Application August 24, 1943, Serial No. 499,859

4 Claims. (Cl. 24—221)

The present invention relates to rotary operative fastener studs of the type employed in rotary operative type fasteners, such as are used for securing together aircraft cowling sheets, and the invention aims generally to improve existing studs.

Rotary operative fasteners as used for aircraft cowling usually comprise a rotary stud member mounted in one of the cowling sheets and adapted to be passed through an aperture in the other sheet and interlockingly engage a cooperative fastener member attached thereto as the result of a partial rotation of the stud.

One type of fastener for such purpose comprises a stud having a head and shank, the latter being provided with radial arms or extensions for engagement with a locking surface of a female or socket fastener member. Such female or socket fastener member may be of any approved form, for example as shown in my Patent No. 2,309,731, dated February 2, 1943, or the patent of William A. Bedford, Jr., No. 2,306,928, dated December 29, 1942.

Rotary operative type fasteners for aircraft cowling must be operative to secure the cowling sheets together under strong clamping pressure. In modern high speed aircraft there is considerable air pressure exerted between the cowling sheets tending to separate them and in order to obtain maximum results the proper length of stud must be carefully selected for each given installation. Furthermore, the cowling sheets of various types of aircraft varies in thickness and to insure proper clamping pressure it has been found necessary for manufacturers to provide an assortment of sizes or lengths of stud, there being approximately nine different lengths provided to accommodate stud lengths from .040 inch to .250 inch.

The present invention aims to improve rotary operative fasteners of the above described type by the provision of an improved stud that may be quickly and simply adjusted to vary the operating stud length or distance between the head and radial arms thereof.

Illustrative of the invention reference is made to the accompanying drawing and annexed description illustrating and describing two preferred embodiments of the invention.

In the drawing:

Fig. 1 is a longitudinal central sectional view through one type of rotary operative fastener installation as employed for aircraft cowling employing my improved stud;

Fig. 2 is a side elevation of one embodiment of my improved stud;

Fig. 3 is a view of the stud at right angles to Fig. 2;

Fig. 4 is a central vertical sectional view thereof;

Fig. 5 is a horizontal sectional view as taken on the line 5—5 of Fig. 4;

Fig. 6 is a view similar to Fig. 4 illustrating an alternative construction;

Fig. 7 is a view similar to Fig. 2 of the form of stud illustrated in Fig. 6; and Fig. 8 is a view similar to Fig. 3 of the form of stud illustrated in Fig. 6.

Referring to the drawing, the spring or socket member for my rotary stud member may be of the type commonly employed in aircraft cowling fasteners, for example, of the type shown in my Patent No. 2,309,731, dated February 2, 1943, wherein a female or socket fastener member 1 is suitably attached to one face of an apertured support 2 and is provided with an outwardly dished stud-receiving seat 3 apertured as at 4 to receive a cooperating rotary stud member 5 rotatably mounted in a part 6 to be attached to the support 2. The stud is preferably of the type having radial arms 17, which advantageously may be formed by means of a crosspin mounted in the stud, which arms engage the stud-receiving seat 3 upon partial rotation of the former and serve to hold the parts 2 and 6 in secure fastened relationship.

In order to maintain the parts 2 and 6 securely in fastened relationship against forces tending to separate them, it is important that the stud length, as determined by the distance between the head of the stud and radial arms, be accurately proportioned according to the distance between the outer face of the part 6 engaging the stud head and the stud-receiving seat.

The present invention provides an improved rotary stud member having a shank and head and radial arms adjustable longitudinally of the stud shank so that the effective stud length, i. e., the distance between the head and arms, may be varied readily to accommodate installations of various sizes and thicknesses.

According to the form of invention illustrated in Figs. 2 to 5, the improved stud member 5 comprises a shank portion 10 having a head 11 at one end thereof, which head may be tapered as shown to seat in a conical depression 7 in the part 6 surrounding the aperture 8 therein, and thus provide a fastening in which the head is substantially flush with the outer face of the part 6. The stud may be rotatably retained in the aperture 8 by suitable means, as for example a spring locking ring 9 seated in an annular groove 9ª as is customary in the art.

The shank 10 is provided with an axial bore 12, preferably throughout the length thereof, which bore opens through the nose end 13 of the shank and which is threaded or tapped as at 14 throughout a portion of the outer end thereof to receive a threaded plug or screw member 15 therein. The side walls of the bored shank 10 are provided with opposed elongated slots 16 intermediate the head and end of the shank to adjustably receive the radial arms 17 carried by an insert 18 slidably mounted in the bore. The insert advantageously may be in the form of a cylindrical plug loosely fitted in the bore and formed with a transverse aperture in which is press-fitted a pin so as to provide the radial arms 17 extending through and beyond the slots 16. A spring member 19 is preferably positioned in the bore between the inner end thereof and the insert to maintain the insert in tensioned engagement with the screw 15.

The stud may be readily assembled by first inserting the spring 19 in the bore, fitting the insert 18 in the bore above it and securing the insert in the bore by press-fitting the crosspin in the insert with its arms 17 extending through the slots 16. The spring 19 obviously acts on the insert to maintain the arms 17 in the outer ends of the slots 16. Adjustment of the insert 18 and radial arms 17 toward the head may be effected by simply rotating the screw 15 in the threaded bore 14 in the nose end of the stud.

The form of adjustable stud shown in Figs. 6, 7 and 8 is similar to the form above described except that the insert 16ª and screw 15ª may be permanently connected and the necessity for the spring 19 eliminated.

According to this form of invention the insert 16ª is formed with a rivet 20 which extends through a counterbore 21 of a hollow screw 15ª and is upset over the marginal edge of the counterbore. The insert 16ª is thus swivelly connected to the screw 15ª so that rotation of the screw in the threaded bore 14 effects adjustment of the insert and arms 17 longitudinally of the stud shank.

According to the invention the screw 15 or 15ª may be sufficiently long to extend beyond the nose 13 of the stud and be fitted with a locking nut 25 threaded thereon to lock the screw in its adjusted position in the bore 14.

Although I have illustrated and described preferred forms of my invention, I do not wish to be limited thereby because the scope of my invention is best defined by the following claims.

I claim:

1. A rotary stud member for separable rotary operative fasteners comprising a shank formed with a head at one end thereof, said shank having an axial bore opening through an end thereof and elongated slots in the sides thereof, an insert mounted in said shank bore and having radial extensions extending through and beyond said slots, spring means in said bore normally urging said insert and extensions away from said shank head, and a member adjustably mounted in the open end of said bore for limiting movement of said insert.

2. A rotary stud member for separable rotary operative fasteners comprising a shank formed with a head at one end thereof, said shank having an axial bore opening through an end thereof and elongated slots in the sides thereof, an insert mounted in said shank bore and having radial extensions extending through and beyond said slots, spring means in said bore normally urging said insert and extensions away from said shank head, and means having adjustable screw threaded engagement with the walls of the shank bore for adjusting the position of the extensions in said slots, said last named means providing a rigid abutment for limiting movement of said extensions in said slots in a direction away from said head.

3. A stud member for separable rotary operative fasteners comprising a shank formed with a head at one end, said shank having an axial bore throughout substantially the length thereof and opposed elongated slots in the sides thereof, an insert mounted in said bore, a pin fitted in said insert and extending through and beyond said slots, and a screw threaded in the outer end of said bore for engaging said pin and adjusting said pin in said slots, and spring means for maintaining said insert in engagement with said screw.

4. A stud member for separable rotary operative fasteners comprising a shank formed with a head at one end, said shank having an axial bore throughout substantially the length thereof and opposed elongated slots in the sides thereof, an insert mounted in said bore, a pin fitted in said insert and extending through and beyond said slots, a screw threaded in the outer end of said bore for engaging said pin and adjusting said pin in said slots and a spring positioned in said bore for maintaining said insert in engagement with said screw.

FRANK E. JOHNSON.